United States Patent
Avritzer

(10) Patent No.: US 8,423,833 B2
(45) Date of Patent: *Apr. 16, 2013

(54) SYSTEM AND METHOD FOR MULTIVARIATE QUALITY-OF-SERVICE AWARE DYNAMIC SOFTWARE REJUVENATION

(75) Inventor: Alberto Avritzer, Mountainside, NJ (US)

(73) Assignee: Siemens Corporation, Iselin, NJ (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/949,913

(22) Filed: Nov. 19, 2010

(65) Prior Publication Data

US 2011/0072315 A1  Mar. 24, 2011

Related U.S. Application Data

(63) Continuation-in-part of application No. 11/225,989, filed on Sep. 14, 2005, now Pat. No. 8,055, 952.

(60) Provisional application No. 61/356,162, filed on Jun. 18, 2010, provisional application No. 60/628,285, filed on Nov. 16, 2004, provisional application No. 61/405,750, filed on Oct. 22, 2010.

(51) Int. Cl.
*G06F 11/00* (2006.01)

(52) U.S. Cl.
USPC .............................. 714/47.1; 714/25; 714/32

(58) Field of Classification Search ............ 714/47.1
See application file for complete search history.

(56) References Cited

U.S. PATENT DOCUMENTS

| | | | | |
|---|---|---|---|---|
| 7,100,079 | B2 * | 8/2006 | Gross et al. | 714/23 |
| 7,502,971 | B2 * | 3/2009 | Cohen et al. | 714/45 |
| 8,055,952 | B2 * | 11/2011 | Avritzer et al. | 714/47.2 |
| 8,271,838 | B2 * | 9/2012 | Avritzer et al. | 714/48 |
| 2004/0078657 | A1 * | 4/2004 | Gross et al. | 714/15 |
| 2006/0048017 | A1 * | 3/2006 | Anerousis et al. | 714/47 |
| 2007/0094544 | A1 * | 4/2007 | Avritzer et al. | 714/38 |
| 2007/0250739 | A1 * | 10/2007 | Avritzer | 714/38 |
| 2008/0010556 | A1 * | 1/2008 | Vaidyanathan et al. | 714/47 |
| 2008/0126881 | A1 * | 5/2008 | Bruckhaus | 714/47 |
| 2008/0320123 | A1 * | 12/2008 | Houlihan et al. | 709/224 |
| 2010/0241905 | A1 * | 9/2010 | Avritzer et al. | 714/38 |

OTHER PUBLICATIONS

Avritzer et al., "Ensuring Stable Performance for Systems That Degrade", Proceedings of the Fifth International Workshop on Software and Performance, WOSP '05, pp. 43-51.

(Continued)

*Primary Examiner* — Kamini Patel

(57) ABSTRACT

A method for monitoring the quality-of-service (QoS) of high priority transactions in a software system includes receiving a specific QoS metric of a high priority transaction, where the QoS metric associated with a plurality of buckets and comparing the sampled specific QoS metric to an expected value for the specific QoS metric. If the sampled specific QoS metric exceeds the corresponding expected value, a bucket for the specific QoS metric is incremented, otherwise the bucket is decremented. If the bucket for the specific QoS metric overflows, the current bucket is reinitialized to zero, a depth of a next bucket for the specific QoS metric is computed, and a number of standard deviations from a mean value for the specific QoS metric is incremented. When the bucket for the specific QoS metric exceeds a threshold, a software rejuvenation routine is executed.

22 Claims, 3 Drawing Sheets

OTHER PUBLICATIONS

Avritzer et al., "Ensuring System Performance for Cluster and Single Server Systems", Journal of Systems & Software, Elsevier North Holland, New York, NY, vol. 80, No. 4, Feb. 16, 2007, pp. 441-454.
"Flow Control of Prioritized Data in a Multimedia Communications System", IBM Technical Disclosure Bulletin, International Business Machines Corp., (Thornwood), US, vol. 37, No. 1, Jan. 1, 1994, pp. 531-532.

International Search Report and Written Opinion dated Aug. 23, 2011.

* cited by examiner

SYSTEM AND METHOD FOR MULTIVARIATE QUALITY-OF-SERVICE AWARE DYNAMIC SOFTWARE REJUVENATION

CROSS REFERENCE TO RELATED UNITED STATES APPLICATIONS

This application claims priority from "QoS Aware Dynamic Software Rejuvenation Algorithms", U.S. Provisional Application No. 61/356,162 of Alberto Avritzer, filed Jun. 18, 2010, the contents of which are herein incorporated by reference in their entirety, and is a continuation-in-part (CIP) of U.S. application Ser. No. 11/225,989 of Avritzer, et al., filed on Sep. 14, 2005 now U.S. Pat. No. 8,055,952, which in turn claims priority from U.S. Provisional Application Ser. No. 60/628,285 of Avritzer, et al., filed on Nov. 16, 2004, the contents of both of which are herein incorporated by reference in their entireties. This application also claims priority from "Multivariate Quality of Service Aware Dynamic Software Rejuvenation Algorithms" U.S. Provisional Application No. 61/405,750 of Alberto Avritzer, filed Oct. 22, 2010, the contents of which are therein incorporated by reference in their entirety.

TECHNICAL FIELD

This disclosure is directed to methods for maintaining QoS requirements in software systems by monitoring the quality of high priority transactions.

DISCUSSION OF THE RELATED ART

Large industrial software systems require extensive monitoring and management to deliver expected performance and reliability. Some specific types of software failures, called soft failures, have been shown to leave the system in a degraded mode, where the system is still operational, but the available system capacity has been greatly reduced. Examples of soft bugs have been documented in several software studies. Soft failures can be caused by the evolution of the state of one or more software data structures during (possibly) prolonged execution. This evolution is called software aging. Software aging has been observed in widely used software. One approach for system capacity restoration for telecommunications systems takes advantage of the cyclical nature of telecommunications traffic. Telecommunications operating companies understand the traffic patterns in their networks well, and therefore can plan to restore their smoothly degrading systems to full capacity in the same way they plan their other maintenance activities. Soft bugs typically occur as a result of problems with synchronization mechanisms, such as semaphores, kernel structures, such as file table allocations, database management systems, such as database lock deadlocks, and other resource allocation mechanisms that are essential to the proper operation of large multi-layer distributed systems. Since some of these resources are designed with self-healing mechanisms, such as timeouts, some systems may recover from soft bugs after a period of time. For example, when the soft bug for a specific Java based e-commerce system was revealed, users were complaining of very slow response time for periods exceeding one hour, after which the problem would clear by itself. However, in other cases, host based worm disruption systems can throttle the rate of connections out of a host.

One theoretical study to determine the optimal time to perform software rejuvenation for aging software with soft failures based on Markov decision models found optimal software rejuvenation times that would minimize the required cost function. The authors developed a Markov decision process model that allows for two queuing policies. In the first policy software rejuvenation is invoked whenever a buffer overflow is detected. In the second policy, packet loss is allowed without triggering software rejuvenation. A related study uses Markov regenerative stochastic Petri Nets to derive a quantitative analysis of software rejuvenation. The model solution supports the selection of the optimal rejuvenation interval to minimize the expected system downtime. Another study evaluated the use of both check pointing and rejuvenation to minimize software completion times was evaluated. Another methodology for the quantitative analysis of software rejuvenation policies is based on the assumption that system degradation can be quantified by monitoring a metric that is co-related with system degradation. A maximum degradation threshold level is defined and two rejuvenation policies based on the defined threshold are presented. The first policy is risk based. It defines a confidence level on the metric, and performs rejuvenation, with a probability that is proportional to the confidence level. The second policy is deterministic and performs rejuvenation as soon as the threshold level is reached. The theory of renewal processes with rewards is used to estimate the expected system down time and to help estimate the proper rejuvenation intervals. Another methodology for proactive software rejuvenation is based on the statistical estimation of resource exhaustion.

When a large infrastructure that supports a high-value business is overwhelmed due to excessive use or to degradation of the number of available resources, software rejuvenation must be quickly triggered to restore the capacity of the large infrastructure. If the degradation is a consequence of degraded environmental conditions, the allowed workload from low-priority transactions should be adjusted to allow for the higher-priority transaction to satisfy their quality-of-service (QoS) requirements.

Large infrastructure based systems that do not support QoS requirements, such as Wi-Fi systems based on the IEEE 802.11 standard, are currently being deployed to support large mission critical systems, such as large transportation systems that support VoIP (Voice-over Internet Protocol) and CCTV (closed-circuit television). These systems cannot satisfy the QoS requirements of high-priority transactions when faced with degraded environmental conditions resulting from, for example, media interference, hidden terminals, shadows, etc.

SUMMARY OF THE INVENTION

Exemplary embodiments of the invention as described herein generally include methods and systems for software rejuvenation that track individual transactions quality-of-service (QoS) and improves the software ability to meet a set of QoS requirements of high priority transactions by reducing the number of low priority transactions allowed in the system. An algorithm according to an embodiment of the invention is applicable to environments that do not support transactions priorities by required applications to meet specific QoS requirements. An algorithm according to an embodiment of the invention can accurately measure the QoS of high priority transactions, where the QoS can be represented by a set of multivariate functions, and uses the measurement results and approximate results for analytical modeling to derive the underlying environmental conditions. If it is found that the high priority transactions are deviating from the required QoS, a fast analytical modeling approximation can quickly establish new threshold on the maximum number of low-priority transactions that are allowed to be executed in the infrastructure.

An algorithm according to an embodiment of the invention can ensure QoS of high-priority transactions by dynamically estimating the infrastructure environmental conditions and by restricting the workload allowed to be carried by low-priority transactions. An analytical performance model and software rejuvenation can quickly detect QoS degradation of high-priority transactions and enforce QoS requirements of these high-priority transactions. In addition, the use of multiple buckets to count the variability in the measured customer affecting metric can distinguish between degradation that is a function of a transient in the arrival process and degradation that is a function of a significant degradation in the infrastructure environment.

An algorithm according to an embodiment of the invention can provide superior performance by tracking a system's ability to meet its QoS requirements and using measured QoS data to determine when to trigger a software rejuvenation routine.

An algorithm according to an embodiment of the invention can be generalized by performing a detailed analysis of performance usage to derive more precise performance signatures for different modes of operation, e.g. busy hour vs. weekend, different load conditions, e.g. high and low loads, and different user profiles.

An algorithm according to an embodiment of the invention could be applied to a network of hosts that support mission critical systems and depend on the successful completion of transactions with hard real-time requirements.

According to an aspect of the invention, there is provided a computer-implemented method for monitoring the quality-of-service (QoS) of high priority transactions in a software system, including receiving a QoS metric of a high priority transaction that is sampled by a software system monitoring infrastructure, where the QoS metric is a specific metric of a set of QoS metrics and is associated with a plurality of buckets, comparing the sampled specific QoS metric to an expected value for the specific QoS metric, where a bucket for the specific QoS metric is incremented if the sampled specific QoS metric exceeds the corresponding expected value, and the bucket for the specific QoS metric is decremented if the sampled specific QoS metric is less than the corresponding expected value, reinitializing the current bucket to zero, computing a depth of a next bucket for the specific QoS metric, and, increasing a number of standard deviations from a mean value for the specific QoS metric, if the bucket for the specific QoS metric overflows, and executing a software rejuvenation routine when the bucket for the specific QoS metric exceeds a threshold.

According to a further aspect of the invention, the method includes initializing the current bucket and the bucket index to zero, and initializing a maximum value of the current bucket to a predetermined maximum.

According to a further aspect of the invention, the depth of the next bucket for the sampled specific QoS metric is computed as $$D[N[i]+1, i] = \frac{D_{MAX}}{T[i] - (\bar{x}[i] + N[i] \times \sigma[i])},$$

where i is an index for the specific QoS metric, N[i] is an index for the current bucket, D[N[i],i] maximum value of the current bucket, $D_{MAX}$ is an overall maximum value for all buckets, T[i] is the sampled QoS metric, $\bar{x}[i]$ a mean of the specific QoS metric, and σ[i] is a standard deviation of the mean QoS.

According to a further aspect of the invention, the method includes reinitializing the current bucket to zero, if the bucket for the specific QoS metric is emptied.

According to a further aspect of the invention, the method includes reinitializing the current bucket to a predetermined maximum and decreasing a number of standard deviations from a mean value for the sampled specific QoS metric, when a value of the current bucket index is greater than zero.

According to a further aspect of the invention, the expected value for the specific QoS metric is $\bar{x}[i]+N[i]\times\sigma[i]$, where N[i] is an index for the current bucket, $\bar{x}[i]$ a mean for the specific QoS metric, and σ[i] is a standard deviation of the mean QoS.

According to a further aspect of the invention, the software rejuvenation routine measures the set of QoS metrics T, computes a channel utilization ρ[i] for each metric as a function of each respective QoS metric i, determines a value ρ'[i]<ρ[i] for which T[i] is an inverse function of ρ[i] that is less than a required value of the specific QoS metric, where each function for each specific QoS metric is determined through a performance analysis of the software infrastructure.

According to a another aspect of the invention, there is provided a computer-implemented method for monitoring the quality-of-service (QoS) of high priority transactions in a software system, including receiving a QoS metric of a high priority transaction that is sampled by a software system monitoring infrastructure, where the QoS metric is a specific metric of a set of QoS metrics and is associated with a plurality of buckets, comparing the sampled specific QoS metric to an expected value for the specific QoS metric, where a bucket for the specific QoS metric is incremented if the sampled specific QoS metric exceeds the corresponding expected value, and the bucket for the specific QoS metric is decremented if the sampled specific QoS metric is less than the corresponding expected value, reinitializing the current bucket to zero, if the bucket for the specific QoS metric is emptied, and executing a software rejuvenation routine when the bucket for the specific QoS metric exceeds a threshold.

According to a further aspect of the invention, if the current bucket for the specific QoS metric overflows, the method includes reinitializing the current bucket to zero, computing a depth of a next bucket for the specific QoS metric based on the amount by which the sampled specific QoS metric exceeds the corresponding expected value, and increasing a number of standard deviations from a mean value for the specific QoS metric.

According to a further aspect of the invention, if the current bucket for the specific QoS metric empties, and the bucket index is greater than zero, the method includes reinitializing the current bucket for the specific QoS metric to a predetermined maximum, and decreasing a number of standard deviations from a mean value for the specific QoS metric.

According to a further aspect of the invention, the method includes initializing the current bucket and the bucket index to zero, and initializing a maximum value of the current bucket to a predetermined maximum.

According to a further aspect of the invention, the depth of the next bucket for the specific QoS metric is computed as $$D[N[i]+1, i] = \frac{D_{MAX}}{T[i] - (\bar{x}[i] + N[i] \times \sigma[i])},$$

where i is an index for the specific QoS metric, N[i] is an index for the current bucket, D[N[i],i] maximum value of the current bucket, $D_{MAX}$ is an overall maximum value for all buckets, T[i] is the sampled QoS metric, $\bar{x}[i]$ a mean of the specific QoS metric, and $\sigma[i]$ is a standard deviation of the mean QoS.

According to a further aspect of the invention, the expected value for the specific QoS metric is $\bar{x}[i]+N[i]\times\sigma[i]$, where N[i] is an index for the current bucket for the specific QoS metric, $\bar{x}[i]$ a mean for the specific QoS metric, and $\sigma[i]$ is a standard deviation of the mean QoS.

According to a further aspect of the invention, the QoS metrics are multivariate functions, and the metrics include response time, packet loss, and jitter.

According to a another aspect of the invention, there is provided a program storage device readable by a computer, tangibly embodying a program of instructions executable by the computer to perform the method steps for monitoring the quality-of-service (QoS) of high priority transactions in a software system.

DETAILED DESCRIPTION OF EXEMPLARY EMBODIMENTS

Figure 1:
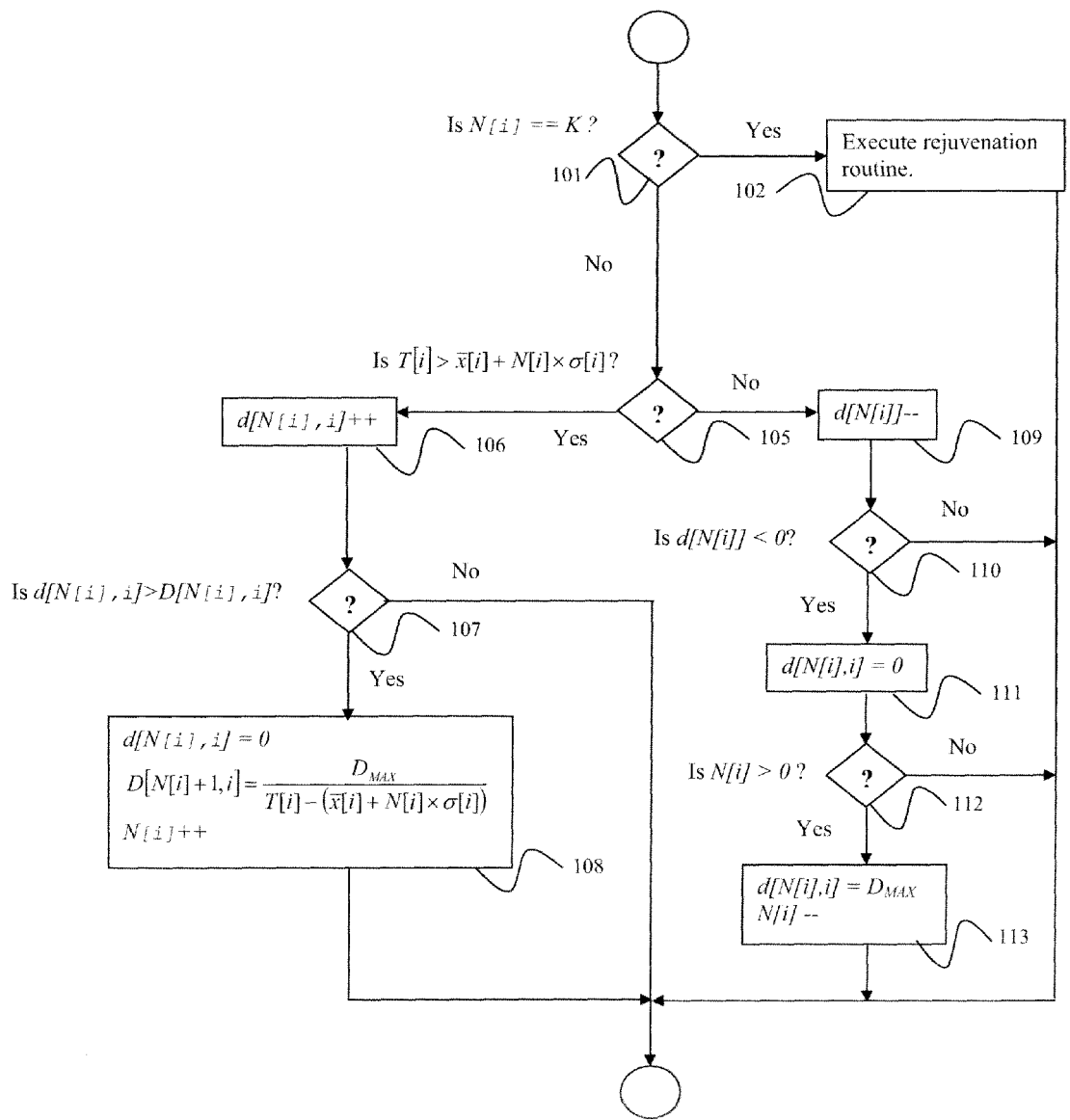
FIG. 1 is a flowchart of a method for maintaining quality-of-service (QoS) requirements in software systems by monitoring the quality of high priority transactions, according to an embodiment of the invention.

Exemplary embodiments of the invention as described herein generally include systems and methods for maintaining quality-of-service (QoS) requirements in software systems by monitoring the quality of high priority transactions. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

An algorithm according to an embodiment of the invention can maximize the probability of a system satisfying QoS requirements of high-priority transactions by monitoring the QoS of high-priority transactions. An algorithm according to an embodiment of the invention uses multiple buckets with varying bucket depths to ensure software rejuvenation is performed at correct times. In a QoS aware software rejuvenation algorithm, software rejuvenation is activated when the QoS metrics of the high-priority transactions have been so degraded that the best course of action is activation of a software rejuvenation routine.

An algorithm according to an embodiment of the invention can distinguish between QoS degradation due to a burst of arrivals and performance degradation due to increased service time as a result of system capacity degradation. System capacity degradation may occur due to hardware failures, software bugs or degradation of environmental conditions, such as storm interference in a Wi-Fi environment. If a system is operating at full capacity and a short burst of arrivals is presented, there would be no benefit in executing a preventive maintenance routine. However, if system capacity has been degraded to such an extent that users are effectively locked out of the system, preventive maintenance may be warranted.

An algorithm according to an embodiment of the invention is based on the premise that the customer affecting metric of performance can be sampled frequently and that the first and second moments of the metric can be estimated when the system is operating at full capacity before the monitoring tool is deployed in production.

A multivariate QoS aware software rejuvenation algorithm according to an embodiment of the invention tracks the end-to-end customer affecting performance metric of the high-priority transactions. If it is discovered that the system infrastructure cannot satisfy the set of QoS requirements of the high-priority transactions, an algorithm according to an embodiment of the invention can solve an optimization task to calculate the maximum allowed number of low-priority transactions that should be allowed to run in the system to maximize the likelihood that the high-priority transactions will meet their QoS requirements.

An algorithm according to an embodiment of the invention tracks an estimate of the quality-of-service set for high-priority transactions, T, in terms of, e.g., response time, packet loss, and jitter (where these particular metric may be indexed by i), by maintaining a history of up to $K \times D_{MAX}[i]$ recent quality of service measurements. K is defined so that when it is reached the system response time has degraded to a level that high-priority transactions can no longer satisfy their QoS objectives. Therefore, the system must be immediately rejuvenated. The notation T[i] is used herein to denote the point estimate of the specific quality of service metric i. An algorithm according to an embodiment of the invention divides the history of recent quality of service i measurements into K buckets of depth $D_{MAX}[i]$. N[i] is a pointer or index to the current bucket for quality of service metric i. The system QoS requirements are used to derive d[i], the number of recent response times ("balls") stored in the current bucket for the quality of service metric i, x[i], the average response time objective for the quality of service metric i, and $\sigma[i]$, the objective standard deviation for the quality of service metric i. K represents the number of standard deviations from the mean that would be tolerated before software rejuvenation is activated. At any given time, the level d[N[i],i] of the current ($N^{th}$) bucket is considered. For each quality of service metric i, when the current bucket overflows, an algorithm according to an embodiment of the invention dynamically computes the depth of the next bucket, and changes the estimation of the expected quality of service measure by adding one standard deviation to the expected value of the metric. This is equivalent to moving to the next bucket. If a bucket underflows, an algorithm according to an embodiment of the invention subtracts one standard deviation from its estimation of the expected delay. This is equivalent moving down to the previous bucket.

Figure 2:
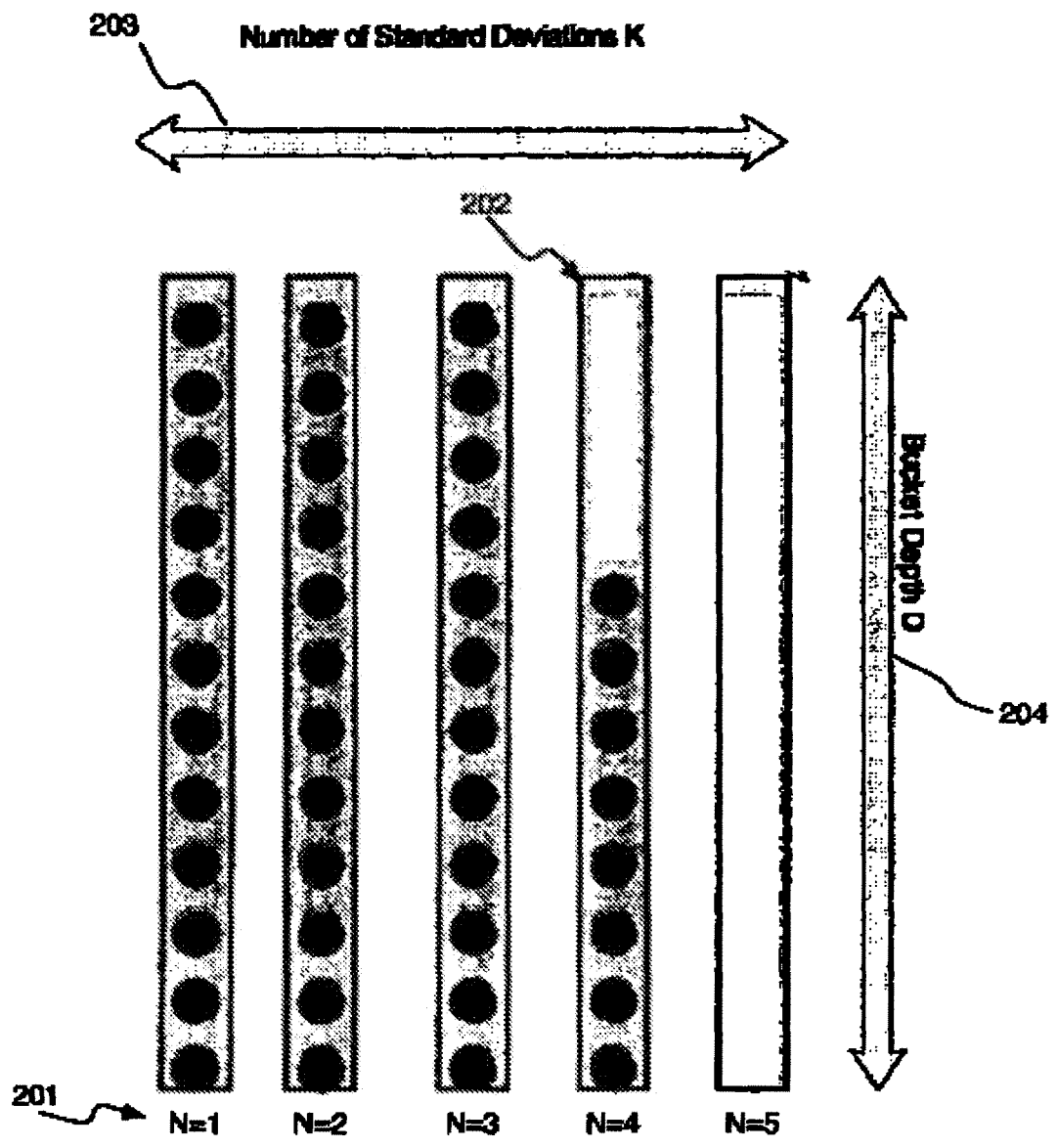
FIG. 2 depicts an exemplary set of buckets, according to an embodiment of the invention.

FIG. 1 is a flowchart of a method for estimating a current value of a monitored performance signature, according to an embodiment of the invention. The method illustrated by the flowchart is performed for each sampled transaction and for each quality of service metric i. In the flowchart, N[i] is the current bucket for tke quality of service metric i, K is the number of buckets, d[N[i],i] is the current depth of the N[i]$^{th}$ bucket, D[N[i],i] is the maximum depth of the N[i]$^{th}$ bucket, and $D_{MAX}$ is the maximum bucket depth. Initialization is performed at system startup and at rejuvenation with d[0,0]= 0, N[0]=0, and D[0,0]=$D_{MAX}$. FIG. 2 depicts an exemplary set of buckets, according to an embodiment of the invention. Referring to FIG. 2, N represents a bucket index 201 and d represents the number of balls stored in a current bucket 202. In the example shown in FIG. 2, N=4, and there are 8 balls in bucket 4. The K buckets 203 are modeled, tracking the number of balls in each bucket.

Referring back to FIG. 1, a method according to an embodiment of the invention begins at step 101 by comparing the current bucket index for the current quality of service metric i N[i] to K, the total number of buckets. If N[i] is equal to K, then a rejuvenation is triggered, and the method exits.

If the value of a bucket N[i] is less than K, the measured QoS metric for the specific metric i, T[i], is compared at step 105 to expected value $\bar{x}[i]+N[i]\times\sigma[i]$. If T[i] is greater than the expected value for the current quality of service metric i, the current bucket d[N[i],i], is incremented at step 106, otherwise it is decremented at step 109. After step 106, the bucket d[N[i],i] is compared at step 107 with D[N[i],i], the maximum depth of the N[i]$^{th}$ bucket. If bucket d[N[i],i] exceeds D[N[i],i], i.e., if bucket d[N[i],i] overflows, then at step 108, d[N[i],i] is reset to 0, the depth of the next bucket (N+1) is dynamically computed as $$D[N[i]+1, i] = \frac{D[i]_{MAX}}{T[i] - (\bar{x}[i] + N[i] \times \sigma[i])},$$

which is equivalent to moving to the next bucket, and the estimation of the expected value is incremented by adding one standard deviation to the expected value of the metric by incrementing the component bucket index N[i].

On the other hand, after step 109, the bucket d[N[i],i] is compared to 0 at step 110. If bucket d[N[i],i] is less than 0, i.e., if bucket d[N[i],i] underflows, then, at step 111, the bucket d[N[i],i] is reset to 0. If, at step 112, N[i] is greater than 0, then at step 113, the current bucket d[N[i],i] is set to $D_{MAX}$, the maximum depth of the bucket, and the bucket index N[i] is decremented.

Equivalent pseudo-code for a QoS aware software rejuvenation algorithm shown in FIG. 1 is as follows.

```
if (N[i] == K ) then execute the software rejuvenation routine.
if (T[i] > x[i] + N[i]×σ [i]) then
    d[N[i],i]++;
else
    d[N[i],i]--;
end
if (d[N[i],i] > D[N[i],i]) then
    d[N[i],i] = 0;
    D[N[i]+1,i] = D_MAX/(T[i] - (x[i] + N[i]×σ [i]));
    N[i]++;
end
if ((d[N[i],i] < 0) AND (N[i] >0)) then
    d[N[i],i] = D_MAX;
    N[i]--;
end
if ((d[N[i],i] < 0) AND (N[i] ==0)) then
    d[N[i],i] = 0;
end
```

An algorithm according to an embodiment of the invention can track a set of QoS metrics of interest and determine the ability of the system to meet its QoS requirements. By dynamically computing the value of D[N[i],i], an algorithm according to an embodiment of the invention can react quickly to significant performance degradation. Resilience to degradation in the customer affecting metric is adjusted by tuning the value of K.

The software rejuvenation routine comprises measuring a set of QoS metrics, T[i], computing the actual channel utilization ρ[i] as a function ρ[i]=f[i]$^{-1}$(T[i]) interactively and finding the value of ρ'[i]<ρ[i] for which T[i]=f[i](ρ'[i])≦T$_{objective}$[i]. The channel utilization is the fraction of time the channel being sampled is busy. The functions f[i] and f'[i] can be obtained through a detailed performance analysis of the infrastructure, and represent a mathematical model of the system.

It should be noted that throughout the specification, embodiments have been described using the terms "bucket" and "ball". These terms are analogous to any method for counting the occurrence of an event. For example, in computer science, one can consider an element of an array as a bucket, wherein the array has K elements (e.g., buckets) and each element stores a number representing a number of times an event, such as a transaction, has occurred (e.g., balls). One of ordinary skill in the art would appreciate that other methods of tracking a set of QoS metrics are possible.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
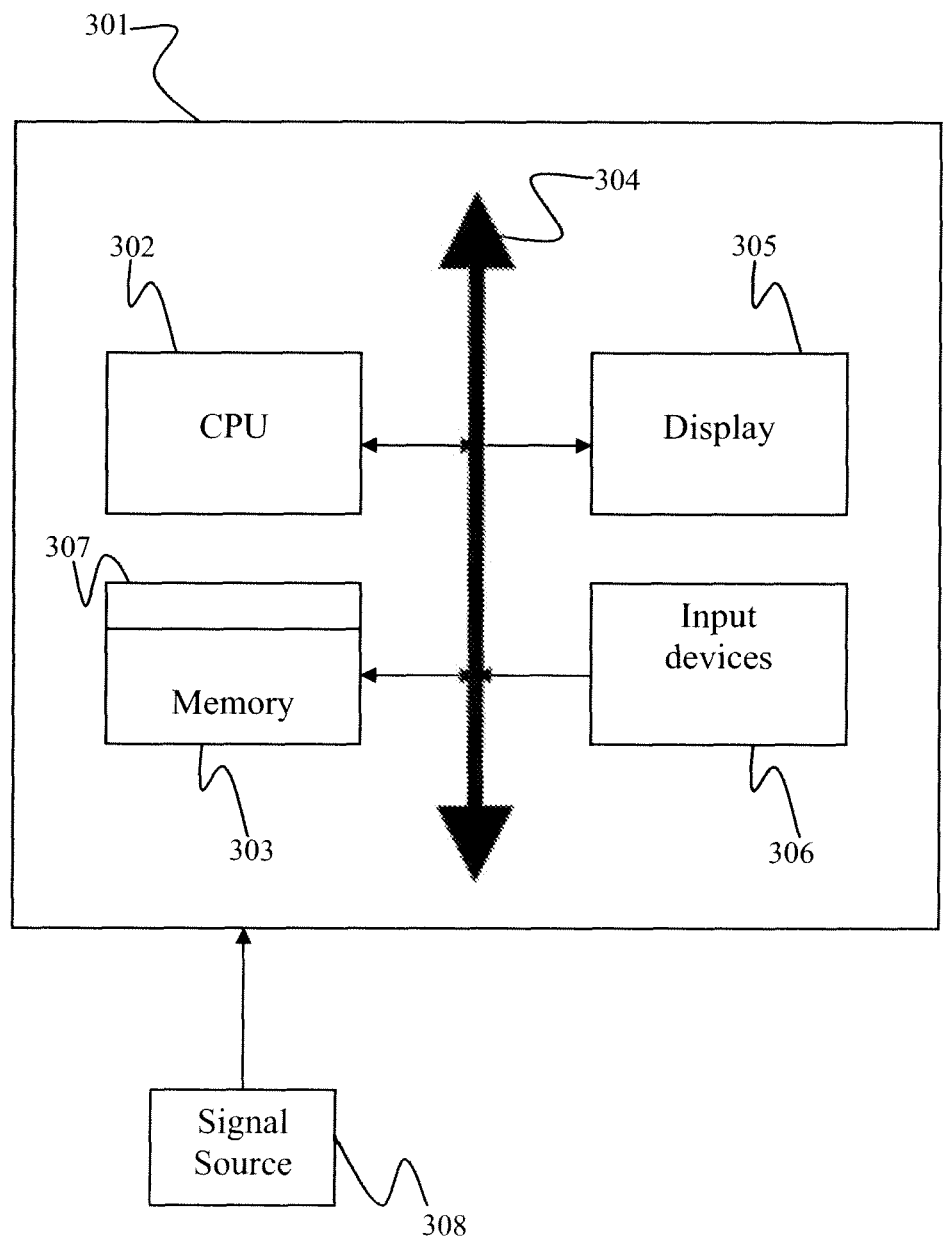
FIG. 3 is a block diagram of an exemplary computer system for implementing a method for maintaining QoS requirements in software systems by monitoring the quality of high priority transactions, according to an embodiment of the invention.

FIG. 3 is a block diagram of an exemplary computer system for implementing a method for detecting security intrusions and soft faults in software systems using performance signatures, according to an embodiment of the invention. Referring now to FIG. 3, a computer system 301 for implementing an embodiment of the present invention can comprise, inter alia, a central processing unit (CPU) 302, a memory 303 and an input/output (I/O) interface 304. The computer system 301 is generally coupled through the I/O interface 304 to a display 305 and various input devices 306 such as a mouse and a keyboard. The support circuits can include circuits such as cache, power supplies, clock circuits, and a communication bus. The memory 303 can include random access memory (RAM), read only memory (ROM), disk drive, tape drive, etc., or a combinations thereof. The present invention can be implemented as a routine 307 that is stored in memory 303 and executed by the CPU 302 to process the signal from the signal source 308. As such, the computer system 301 is a general purpose computer system that becomes a specific purpose computer system when executing the routine 307 of the present invention.

The computer system 301 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method for monitoring the quality-of-service (QoS) of high priority transactions in a software system, the method implemented by the computer comprising the steps of:
   receiving a QoS metric of a high priority transaction that is sampled by a software system monitoring infrastructure, wherein said QoS metric is a specific metric of a set of QoS metrics and is associated with a plurality of buckets;
   comparing said sampled specific QoS metric to an expected value for the specific QoS metric, wherein a bucket for the specific QoS metric is incremented if the sampled specific QoS metric exceeds the corresponding expected value, and the bucket for the specific QoS metric is decremented if the sampled specific QoS metric is less than the corresponding expected value;
   reinitializing the current bucket to zero, computing a depth of a next bucket for the specific QoS metric, and, increasing a number of standard deviations from a mean value for the specific QoS metric, if the bucket for the specific QoS metric overflows; and
   executing a software rejuvenation routine when said bucket for said specific QoS metric exceeds a threshold.

2. The method of claim 1, further comprising initializing the current bucket and the bucket index to zero, and initializing a maximum value of the current bucket to a predetermined maximum.

3. The method of claim 1, wherein the depth of the next bucket for the sampled specific QoS metric is computed as $$D[N[i]+1, i] = \frac{D_{MAX}}{T[i] - (\bar{x}[i] + N[i] \times \sigma[i])},$$

wherein i is an index for the specific QoS metric, N[i] is an index for the current bucket, D[N[i],i] maximum value of the current bucket, $D_{MAX}$ is an overall maximum value for all buckets, T[i] is the sampled QoS metric, $\bar{x}[i]$ a mean of the specific QoS metric, and $\sigma[i]$ is a standard deviation of the mean QoS.

4. The method of claim 1, further comprising reinitializing the current bucket to zero, if the bucket for the specific QoS metric is emptied.

5. The method of claim 4, further comprising reinitializing the current bucket to a predetermined maximum and decreasing a number of standard deviations from a mean value for the sampled specific QoS metric, when a value of the current bucket index is greater than zero.

6. The method of claim 1, wherein said expected value for the specific QoS metric is $\bar{x}[i]+N[i]+\sigma[i]$, wherein N[i] is an index for the current bucket, $\bar{x}[i]$ a mean for the specific QoS metric, and $\sigma[i]$ is a standard deviation of the mean QoS.

7. The method of claim 1, wherein said software rejuvenation routine measures said set of QoS metrics T, computes a channel utilization ρ[i] for each metric as a function of each respective QoS metric i, determines a value ρ'[i]<ρ[i] for which T[i] is an inverse function of ρ[i] that is less than a required value of said specific QoS metric, wherein each function for each specific QoS metric is determined through a performance analysis of the software infrastructure.

8. A computer-implemented method for monitoring the quality-of-service (QoS) of high priority transactions in a software system, the method implemented by the computer comprising the steps of:
   receiving a QoS metric of a high priority transaction that is sampled by a software system monitoring infrastructure, wherein said QoS metric is a specific metric of a set of QoS metrics and is associated with a plurality of buckets;
   comparing said sampled specific QoS metric to an expected value for the specific QoS metric, wherein a bucket for the specific QoS metric is incremented if the sampled specific QoS metric exceeds the corresponding expected value, and the bucket for the specific QoS metric decremented if the sampled specific QoS metric is less than the corresponding expected value;
   reinitializing the current bucket to zero, if the bucket for the specific QoS metric is emptied; and
   executing a software rejuvenation routine when said bucket for said specific QoS metric exceeds a threshold.

9. The method of claim 8, wherein if the current bucket for the specific QoS metric overflows, the method further comprises:
   reinitializing the current bucket to zero;
   computing a depth of a next bucket for the specific QoS metric based on the amount by which the sampled specific QoS metric exceeds the corresponding expected value; and
   increasing a number of standard deviations from a mean value for the specific QoS metric.

10. The method of claim 8, wherein if the current bucket for the specific QoS metric empties, and the bucket index is greater than zero, the method further comprises:
    reinitializing the current bucket for the specific QoS metric to a predetermined maximum; and
    decreasing a number of standard deviations from a mean value for the specific QoS metric.

11. The method of claim 7, further comprising initializing the current bucket and the bucket index to zero, and initializing a maximum value of the current bucket to a predetermined maximum.

12. The method of claim 8, wherein the depth of the next bucket for the specific QoS metric is computed as $$D[N[i]+1, i] = \frac{D_{MAX}}{T[i] - (\bar{x}[i] + N[i] \times \sigma[i])},$$

wherein i is an index for the specific QoS metric, N[i] is an index for the current bucket, D[N[i]] maximum value of the current bucket, $D_{MAX}$ is an overall maximum value for all buckets, T[i] is the sampled QoS metric, $\bar{x}[i]$ a mean of the specific QoS metric, and $\sigma[i]$ is a standard deviation of the mean QoS.

13. The method of claim 8, wherein said expected value for the specific QoS metric is $\bar{x}[i]+N[i]\times\sigma[i]$, wherein N[i] is an index for the current bucket for the specific QoS metric, $\bar{x}[i]$ a mean for the specific QoS metric, and $\sigma[i]$ is a standard deviation of the mean QoS.

14. The method of claim 8, wherein the QoS metrics are multivariate functions, and the metrics include response time, packet loss, and jitter.

15. A program storage device readable by a computer, tangibly embodying a program of instructions executable by the computer to perform the method steps for monitoring the quality-of-service (QoS) of high priority transactions in a software system, the method implemented by the computer comprising, the steps of:

receiving a QoS metric of a high priority transaction that is sampled by a software system monitoring infrastructure, wherein said QoS metric is a specific metric of a set of QoS metrics and is associated with a plurality of buckets;

comparing said sampled specific QoS metric to an expected value for the specific QoS metric, wherein a bucket for the specific QoS metric is incremented if the sampled specific QoS metric exceeds the corresponding expected value, and the bucket for the specific QoS metric is decremented if the sampled specific QoS metric is less than the corresponding expected value;

reinitializing the current bucket to zero, computing a depth of a next bucket for the specific QoS metric, and, increasing a number of standard deviations from a mean value for the specific QoS metric, if the bucket for the specific QoS metric overflows; and executing a software rejuvenation routine when said bucket for said specific QoS metric exceeds a threshold.

16. The computer readable program storage device of claim 15, the method further comprising initializing the current bucket and the bucket index to zero, and initializing a maximum value of the current bucket to a predetermined maximum.

17. The computer readable program storage device of claim 15, wherein the depth of the next bucket for the sampled specific QoS metric is computed as $$D[N[i]+1, i] = \frac{D_{MAX}}{T[i] - (\bar{x}[i] + N[i] \times \sigma[i])},$$

wherein i is an index for the specific QoS metric, N[i] is an index for the current bucket, D[N[i],i] maximum value of the current bucket, $D_{MAX}$ is an overall maximum value for all buckets, T[i] is the sampled QoS metric, $\bar{x}[i]$ a mean of the specific QoS metric, and σ[i] is a standard deviation of the mean QoS.

18. The computer readable program storage device of claim 15, the method further comprising reinitializing the current bucket to zero, if the bucket for the specific QoS metric is emptied.

19. The computer readable program storage device of claim 18, the method further comprising reinitializing the current bucket to a predetermined maximum and decreasing a number of standard deviations from a mean value for the sampled specific QoS metric, when a value of the current bucket index is greater than zero.

20. The computer readable program storage device of claim 15, wherein said expected value for the specific QoS metric is $\bar{x}[i]+N[i]\times\sigma[i]$, wherein N[i] an index for the current bucket, $\bar{x}[i]$ a mean for the specific QoS metric, and σ[i] is a standard deviation of the mean QoS.

21. The computer readable program storage device of claim 15, wherein said software rejuvenation routine measures said set of QoS metrics T, computes a channel utilization ρ[i] for each metric as a function of each respective QoS metric i, determines a value ρ'[i]<ρ[i] for which T[i] is an inverse function of ρ[i] that is less than a required value of said specific QoS metric, wherein each function for each specific QoS metric is determined through a performance analysis of the software infrastructure.

22. The computer readable program storage device of claim 15, wherein the QoS metrics are multivariate functions, and the metrics include response time, packet loss, and jitter.

* * * * *